Figure 1:
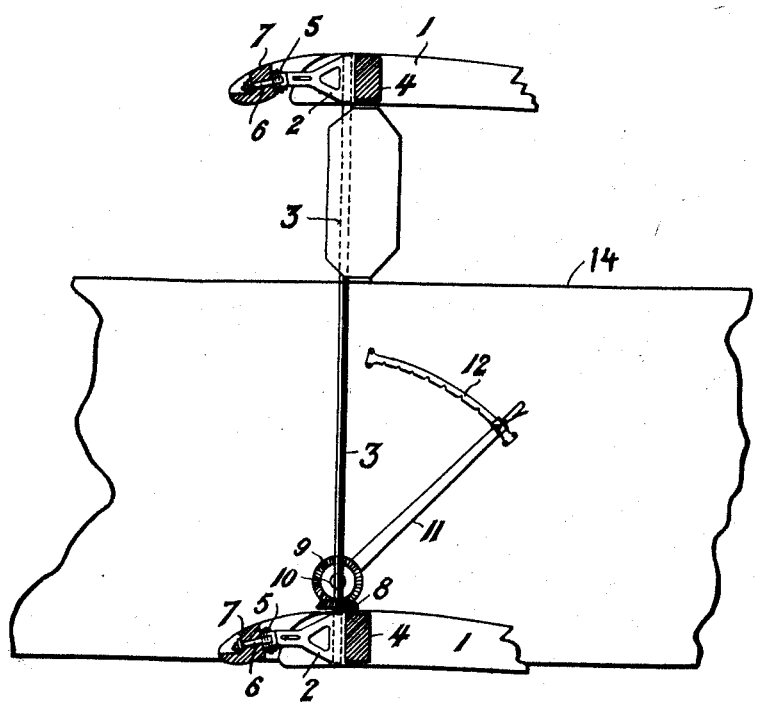

F. H. PAGE.
WING AND SIMILAR MEMBER OF AIRCRAFT.
APPLICATION FILED APR. 27, 1921.

F. H. PAGE.
WING AND SIMILAR MEMBER OF AIRCRAFT.
APPLICATION FILED APR. 27, 1921.
1,394,344.  Patented Oct. 18, 1921.
2 SHEETS—SHEET 2.
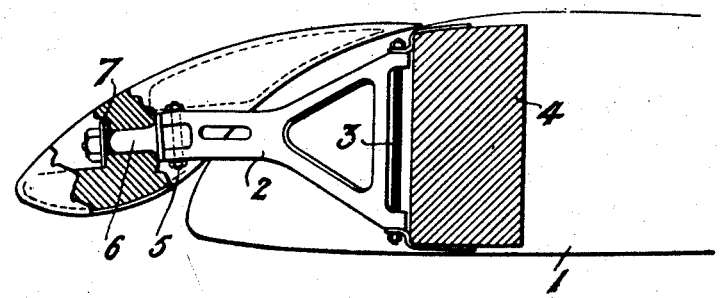
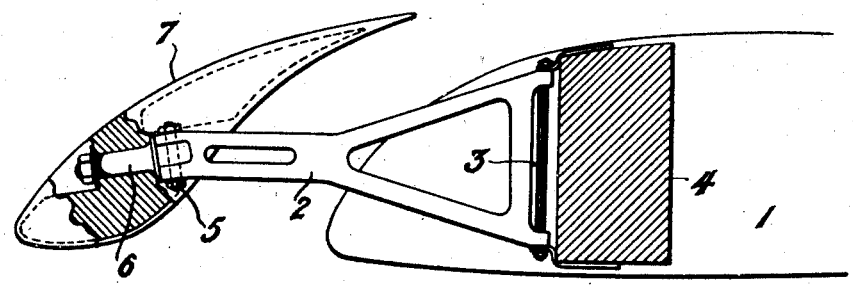

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING AND SIMILAR MEMBER OF AIRCRAFT.

1,394,344.  Specification of Letters Patent.  Patented Oct. 18, 1921.

Application filed April 27, 1921. Serial No. 464,897.

*To all whom it may concern:*

Be it known that I, FREDERICK HANDLEY PAGE, a subject of the King of Great Britain, residing at London, England, have invented certain new and useful Improvements in the Wings and Similar Members of Aircraft, of which the following is a specification:

In the specification of Patent No. 1353666, 21st September, 1920, wings for aeroplane flying machines have been described, which wings are composed of two or more parts consisting of a wing-section main wing and a forwardly-located part or parts termed auxiliary wings, which latter are also of wing-section and are connected or formed with the main wing, but so that open slots extending substantially throughout the wing in a direction transversely of the direction of flight exist between either the auxiliary wings, or between an auxiliary wing and the main wing; in some instances the auxiliary wings are pivoted or otherwise adjustable relatively to each other and to the main wing so as to close said slots when required.

In the example described in the prior specification, arms pivoted on the main wing pivotally carry an auxiliary wing on their ends and by a parallel motion of the said arms the auxiliary and main wings can be adjusted in distance in parallel manner, relatively to each other, to open or close the slot. The axes of the pivots at the ends of the arms were parallel to each other, and therefore the auxiliary wing could have adjustment relatively to the main wing after the manner of a parallel ruler, and means were provided by which the adjustment could be effected by the aviator.

Now it has been found that generally the angle between the chord of the main wing and that of the auxiliary wing when in its best position with slot fully open, is greater than the angle between the chord of main wing and that of the auxiliary wing when in its best position with slot completely closed; as in the one case with closed slot it is advantageous in order to secure minimum head resistance for the complete wing structure, to arrange the auxiliary wing to fit the main wing as snugly as possible, while in the other case with open slot it is advantageous that the chord line of the auxiliary wing be at an altered angle, so that the form of the slot between the auxiliary and main wing shall be such, that the opening on the under surface is greater in the direction of the longitudinal axis of the machine than the opening on the upper surface, and since in both cases with slot either open or closed it is frequently preferable that the lower edge of auxiliary wing be substantially on the chord line of main wing, it will be seen that in order to satisfy all these conditions, a change of angle must be provided between the chords of auxiliary and main wings during the operation of opening or closing the slot.

Now according to the present invention, arms pivoted to the main wing about axes at or about right angles to the chord of the said main wing, pivotally carry at their opposite ends the auxiliary wing, and the two pivotal axes of each arm are so angularly arranged relatively to each other, and the auxiliary wing is so connected to its pivot on said arm, that the movement of each arm necessary to bring the auxiliary wing away from or into contact with the main wing to partially or wholly open or close the slot causes at the same time a change in the angle formed by the chord of the auxiliary wing with the chord of the main wing, so that when the auxiliary wing is in position with the slot fully open, the said angle between the chord of the auxiliary wing and the chord of the main wing is greater than the corresponding angle when the slot is closed, and thus when the auxiliary wing is so closed onto the main wing the tail of the auxiliary wing lies snugly upon the upper surface of the main wing.

In carrying out this invention and to attain this result, the pivot pin connecting the end of each arm to the auxiliary wing is set at a requisite angle to the pivot pin which connects the end of the same arm to the main wing, and as a corollary the pivot pin connecting the end of each arm to the auxiliary wing must be carried by a member capable of angular adjustment about an axis at right angles to the axis of the said pivot pin.

The invention will be described by means of the constructional example shown on the accompanying drawings, whereon Figure 1 shows a part longitudinal section of so much of an aeroplane flying machine as is necessary for the illustration of an example of construction of this invention. Fig. 2 shows, on an enlarged scale, a wing-section main wing and a wing-section auxiliary wing with the latter closed upon the main wing, and Fig. 3 is a similar view showing the wing-section auxiliary wing distanced from the main wing so that a slot is produced between the auxiliary wing and the main wing.

Referring to the drawings and particularly to Figs. 2 and 3 of the example of construction shown, the main wing 1 carries a plurality of arms 2, shown as each pivoted by a pin 3 to suitable brackets connected with the spar 4 of the main wing 1, the pivot pin 3 being substantially at or about right angles to the chord of the main wing 1.

The end of each arm 2 distant from the pivot pin 3 is fitted with an auxiliary wing pivot pin 5 connecting that end of the arm 2 with a bolt or equivalent 6 fixed in a housing in the auxiliary wing 7, and it will be observed that the pivot pin 5 is at an inclination to the pivot pin 3, while it is also to be remarked that the bolt or equivalent 6 is capable of movement angularly about its axis in its housing in the auxiliary wing 7 which the said bolts 6 on the arms 2 support.

With this construction it should also be understood that all the pivot pins 3 are parallel to each other, and all the pivot pins 5 are parallel to each other.

With such a construction of carrying means for the auxiliary wing 7, the latter, when closed onto the main wing, will fit the same as snugly as possible, as shown at Fig. 2, while when the auxiliary wing 7 is distanced from the edge of the main wing 1, as at Fig. 3, the chord line of the auxiliary wing will be at an altered angle so that the opening of the slot on the under surface is greater, in the direction of the longitudinal axis of the machine, than the opening on the upper surface.

Means are provided whereby the auxiliary wing 7 may receive the desired adjustments relatively to the main wings 1, which means are within reach and are operable by the aviator, and an example of construction is shown at Fig. 1. At Fig. 1 the pivot pin 3 of the arms 2 is constituted by a continuous shaft indicated by the numeral 3, and a bevel pinion 8 is fixed on the shaft 3 gearing with a bevel pinion 9 on a shaft 10, to which shaft 10 is fixed an operating lever 11, the position of which can be retained by a segment rack 12. Interplane struts 13 connect the wing structures, and 14 represents a portion of a fuselage.

What I claim as my invention and desire to secure by Letters Patent is:—

1. In aeroplane flying machines; wing structures each comprising a wing-section main wing, a wing-section auxiliary wing parallel to and ajacent the edge of said main wing, a plurality of pivots carried by said main wing at about right angles to the chord thereof, a plurality of arms each having one end mounted on one of said pivots, a pivot carried by the opposite end of each arm and at an angle to the first-mentioned pivot carried by said main wing, a plurality of members proceeding from said auxiliary wing at right angles to the axes of said angularly arranged pivots carried by said arms to engage said angularly arranged pivots to support said auxiliary wing, means for connecting said members to said auxiliary wing to permit of relative movement between said members and said auxiliary wing, and means for rocking said arms about said pivots carried by the main wing in a parallel manner to bring the auxiliary wing away from or into contact with said main wing to partially open or close a slot between said auxiliary and main wings and simultaneously to cause a change to take place in the angle formed by the chord of said auxiliary wing with the chord of the main wing whereby when said auxiliary wing is distanced from said main wing the opening of the slot on the under surface in the direction of the longitudinal axis of the machine is greater than the opening on the upper surface, and when said auxiliary wing is closed on to said main wing said auxiliary wing fits snugly thereon.

2. In aeroplane flying machines; wing structures each comprising a wing-section main wing, a forwardly-located wing-section auxiliary wing parallel to and adjacent the edge of said main wing, a plurality of pivots carried by said main wing at about right angles to the chord thereof, a plurality of arms each having its rear end mounted on one of said pivots, a pivot carried by the forward end of each arm and at an angle to said pivots at the rear end of each arm, a plurality of members proceeding rearwardly from said auxiliary wing at right angles to the axes of said pivots carried at the forward ends of said arms to engage said pivots to support said auxiliary wing, means for connecting said members to said auxiliary wing to permit of relative movement between said members and said auxiliary wing, and means for rocking said arms about their rearward pivots in a parallel manner to bring the auxiliary wing away from or into contact with said main wing to partially open or close a slot between said auxiliary and main wings and simultaneously to cause a change to take place in the angle formed by the chord of the auxiliary wing with the chord of the main wing whereby when said auxiliary wing is distanced from said main wing the opening of the slot on the under surface in the direction of the longitudinal axis of the machine is greater than the opening on the upper surface, and when said auxiliary wing is closed on to said main wing its rearward surface fits snugly thereon.

3. In aeroplane flying machines; wing structures each comprising a wing-section main wing, a forwardly-located wing-section auxiliary wing parallel to and adjacent the edge of said main wing, a plurality of pivots carried by said main wing at about right angles to the chord thereof, a plurality of arms each having its rear end mounted on one of said pivots, a pivot carried by the forward end of each arm and at an angle to said pivot at the rear end of each arm, a plurality of members each comprising a bolt, said auxiliary wing having housings at proper distances apart one to receive each bolt, means to retain said bolts against movement in the direction of their axes while permitting same to have angular rotary adjustment, the axes of said bolts extending at right angles to the axes of the pivots on the forward ends of said arms, each of said bolts having a coaxial extension rearward of said auxiliary wing, said coaxial extension of said bolt having a bearing to receive said pivot pin on the forward end of said arm, and means for rocking said arms about their rearward pivots in a parallel manner to bring the auxiliary wing away from or into contact with said main wing to partially open or close a slot between said auxiliary and main wings and simultaneously to cause a change to take place in the angle formed by the chord of said auxiliary wing with the chord of the main wing whereby when said auxiliary wing is distanced from said main wing the opening of the slot on the under surface in the direction of the longitudinal axis of the machine is greater than the opening on the upper surface.

4. In aeroplane flying machines; a plurality of wing structures located one above another each comprising a wing-section main wing and a wing-section auxiliary wing extending adjacent the forward edge of said main wing and in a direction transversely of the line of flight, interplane struts connecting the main wings of said wing structures, a fuselage located between said wing structures, a plurality of pivots carried by each main wing at about right angles to the chord thereof, a plurality of arms each having its rear end mounted on one of said pivots, a pivot carried by the forward end of each arm and at an angle to said pivot at the rear end of each arm, a plurality of members proceeding rearwardly from said auxiliary wing at right angles to the axes of said pivots carried at the forward ends of said arms to engage said angularly arranged pivots to support said auxiliary wing, means for connecting said members to said auxiliary wing to permit of relative movement between said members and said auxiliary wing, a shaft connecting one of the pivot pins carried by the upper main wing to an oppositely-located pivot pin carried by the lower main wing, and means for giving angular adjustment about its axis to said shaft to operate said arms carrying said auxiliary wings to bring said auxiliary wings away from or into contact with said main wings to partially open or close a slot between them and simultaneously to cause a change to take place in the angle formed by the chords of said auxiliary wings with the chords of said main wings.

It witness whereof I have hereunto set my hand in the presence of two witnesses.

FREDERICK HANDLEY PAGE.

Witnesses:
THOMAS WILLIAM ROGERS,
WALTER JAMES SKERTEN.